(12) United States Patent
Pagan

(10) Patent No.: US 7,752,274 B2
(45) Date of Patent: Jul. 6, 2010

(54) APPARATUS AND METHOD FOR FILTERING AND SELECTIVELY INSPECTING E-MAIL

(75) Inventor: William Gabriel Pagan, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 1129 days.

(21) Appl. No.: 11/278,523

(22) Filed: Apr. 3, 2006

(65) Prior Publication Data

US 2007/0233787 A1 Oct. 4, 2007

(51) Int. Cl.
*G06F 15/16* (2006.01)
*G06F 3/048* (2006.01)
(52) U.S. Cl. ...................................... 709/206; 715/711
(58) Field of Classification Search .................. 709/206
See application file for complete search history.

(56) References Cited

U.S. PATENT DOCUMENTS

| | | | | |
|---|---|---|---|---|
| 6,216,134 | B1* | 4/2001 | Heckerman et al. | 707/104.1 |
| 6,732,157 | B1 | 5/2004 | Gordon et al. | 709/206 |
| 6,769,016 | B2 | 7/2004 | Rothwell et al. | 709/206 |
| 6,772,196 | B1 | 8/2004 | Kirsch et al. | 709/206 |
| 7,142,664 | B2* | 11/2006 | Seligmann | 379/373.01 |
| 7,305,709 | B1* | 12/2007 | Lymer et al. | 726/25 |
| 7,522,910 | B2* | 4/2009 | Day | 455/412.1 |
| 2005/0022014 | A1* | 1/2005 | Shipman | 713/201 |
| 2005/0138110 | A1* | 6/2005 | Redlich et al. | 709/201 |
| 2006/0010497 | A1* | 1/2006 | O'Brien et al. | 726/26 |
| 2006/0206571 | A1* | 9/2006 | Kuwahara | 709/206 |
| 2007/0022000 | A1* | 1/2007 | Bodart et al. | 705/10 |
| 2007/0220607 | A1* | 9/2007 | Sprosts et al. | 726/24 |
| 2007/0226340 | A1* | 9/2007 | Hastings et al. | 709/226 |
| 2009/0288147 | A1* | 11/2009 | Yeung et al. | 726/4 |

OTHER PUBLICATIONS

"Free Mail" https://freemailing0102.web.de/online, last accessed Mar. 2006.
pic18409.jpg—shows a German web inbox with the friends and acquaintances tab selected. Email received is listed as is without any spam indications.
pic01848.jpg—shows a German web inbox with the unknown tab selected. Email received is listed having a color bar indicating a spam threat level.
pic08445.jpg—shows a German web inbox with the unwanted tab selected. Email received is listed having a color bar indicating a spam threat level (more red indicates higher threat).

* cited by examiner

*Primary Examiner*—Jeffrey Pwu
*Assistant Examiner*—Saad A Waqas
(74) *Attorney, Agent, or Firm*—Kunzler Needham Massey & Thorpe

(57) ABSTRACT

An apparatus and method are disclosed for selectively filtering and inspecting incoming e-mail. The steps to selectively filter and inspect incoming e-mail include: assigning a risk value to each section of an incoming e-mail, presenting the incoming e-mail with sections blocked based on the risk value, and selectively disclosing blocked sections of the e-mail to a reviewer based on input from the reviewer. The method provides a way for a reviewer to filter risky e-mails based on multiple criteria, and safely review filtered e-mails to ensure legitimate e-mails are not incorrectly filtered.

18 Claims, 7 Drawing Sheets

Risk assessment module
202

| Section | Category | | | | | Section risk |
|---|---|---|---|---|---|---|
| | Offensive language | Sales language | Executable code | Picture | Sender | |
| Subject line | 25 | 10 | 0 | 0 | 0 | 25 |
| Text body | 65 | 35 | 0 | 0 | 10 | 65 |
| Embedded image | 0 | 0 | 0 | 0 | 10 | 10 (N/A) |
| Embedded code | 0 | 0 | 0 | 0 | 10 | 10 (N/A) |
| Attachment | 120 | 0 | 0 | 90 | 10 | 120 |

APPARATUS AND METHOD FOR FILTERING AND SELECTIVELY INSPECTING E-MAIL

BACKGROUND OF THE INVENTION

1. Field of the Invention

This invention relates to filtering e-mail, and more particularly relates to allowing a user to more safely inspect and accept filtered e-mail.

2. Description of the Related Art

E-mail filtering systems are a critical component of the business world today. Some filtering systems, called spam filters, try to weed out unsolicited and undesirable e-mail that clogs the user's inbox and reduces productivity. Other filters may try to block e-mails with offensive text or pictures, e-mails with imbedded scripts or executable code, and other types of content that present a security or work environment risk. While the current e-mail filtering technology can be quite sophisticated, it still suffers from a number of drawbacks.

The most important drawback of the current e-mail filtering technology is that all filtered e-mails are treated the same, and as a practical matter are typically made unavailable to the user. Some useful e-mails may be incorrectly filtered, and the unavailability of good e-mails trapped by the filters is an important enough problem that email service providers are considering a pay-per-email system that allows legitimate e-mailers to pay their way through the filtering system to ensure that legitimate e-mails get delivered. Once an e-mail is filtered in the current technology, the user may be able to find and accept that e-mail only by accessing a junk e-mail location and sorting through potentially thousands of e-mails filled with offensive and/or risky content.

A second drawback of the current e-mail filtering technology is that e-mail is accepted or rejected on a pass-fail basis only. Thus, the user has no control over the treatment of potentially useful e-mails, and an e-mail which narrowly meets filtering criteria is treated no differently than an e-mail which is obviously spam. Further, the user has no safe reviewing method for filtered e-mails, where they can peek at relatively safe content or portions of the content before deciding whether to accept or reject the e-mail.

From the foregoing discussion, it should be apparent that a need exists for an apparatus and method that allows a more nuanced filtering method than a simple pass/fail check to block an e-mail. Beneficially, such an apparatus and method would allow the user to safely review blocked or partially blocked e-mail such that good e-mails are not filtered improperly and thereby made unavailable the user.

SUMMARY OF THE INVENTION

The present invention has been developed in response to the present state of the art, and in particular, in response to the problems and needs in the art that have not yet been fully solved by currently available e-mail filtering technology. Accordingly, the present invention has been developed to provide an apparatus, a computer program product, and a method for partially blocking potentially risky e-mail content, and for selectively reviewing blocked e-mails to recover those that may contain legitimate content.

An apparatus is provided with modules and functional elements configured to execute the necessary steps of blocking and selectively inspect filtered e-mail. These modules in the described embodiments include a risk assessment module, a risk management module, and a review interface.

The risk assessment module, in one embodiment, is configured to assign a risk value to each section of an incoming e-mail. The sections of an incoming e-mail may include a subject line, a text body of the e-mail, an embedded image, one or more attachments, and embedded executable code. In a further embodiment, the risk assessment module may determine a set of constituent risk values for each section of the incoming e-mail, and assign the risk value to each section based on the set of constituent risk values. The risk value for a section may be set to the maximum constituent risk value from the set of constituent risk values for that section. The constituent risk values may correspond to a set of risk categories. In one embodiment, the risk categories may be offensive language, unsolicited sales language, the presence of a picture, the presence of executable code, and information about the sender.

The risk management module, in one embodiment, is configured to present the incoming e-mail to a reviewer. The risk management module may block sections of the e-mail deemed to be a risk by comparing the risk value of the section to a risk value scale. Sections without a risk value or a with a risk value that fails to satisfy a risk value threshold are displayed without any blocking.

The review interface module may be configured to selectively disclose blocked sections of the incoming e-mail message to the reviewer in response to user input from the reviewer. In one embodiment, the reviewer can change the risk value scale of a selected e-mail to disclose more sections of the e-mail and enable a better determination of whether a particular e-mail should be permitted. In another embodiment, the reviewer may select specific sections of an e-mail to be disclosed to give the reviewer more information on whether a selected e-mail is legitimate.

The apparatus may further include an adaptation module and a user customization module configured to learn the reviewing habits and/or risk tolerance level of the reviewer. In one embodiment, the adaptation module may be configured to record the risk value assigned to a section of an incoming e-mail, and to record the user input regarding the incoming e-mail. The adaptation module may store a user profile containing information derived from the recorded values. The customization module may be configured to modify which sections of future e-mails may be disclosed according to the user profile. Thus, the adaptation and user customization modules may work together to learn and emulate the risk management habits of the reviewer.

The apparatus may further include an administrator rules module configured to use administrator rules when blocking and selectively reviewing sections of e-mail messages. The administrator rules module may be configured read administrator rules data from a mail server. The administrator rules module may then apply the administrator rules data when the risk management module assigns risk values to each section of the incoming e-mail. In an alternative embodiment, the administrator rules module may apply the administrator rules data when the risk management module blocks sections of the incoming e-mail.

The apparatus may further include user preferences module configured to use user preferences when blocking and selectively reviewing e-mail. The user preferences module may be configured read user preferences data from a mail server. The user preferences module may then apply the user preferences data when the risk management module assigns risk values to each section of the incoming e-mail. In an alternative embodiment, the user preferences module may apply the user preferences data when the risk management module blocks sections of the incoming e-mail.

A computer program product of the present invention is presented to filter and selectively review e-mail. The computer program product may include the logic necessary to assign a risk value to each section of an incoming e-mail message, to block sections of an incoming e-mail based on a risk value scale, to present the incoming e-mail to a reviewer having sections blocked, and to selectively disclose sections of the e-mail message based on user input. The computer program product may further include the logic necessary to accept user input in the form of a Graphical User Interface (GUI) slider defining a risk value threshold, where the computer program product blocks or discloses sections of the incoming e-mail based on the risk value associated with each section of the incoming e-mail and the setting of the GUI slider.

In a further embodiment, the computer program product may include the logic necessary to accept user input as a series of binary selections, wherein each binary selection corresponds to a section of the incoming e-mail, and the state of each binary selection determines whether the corresponding section of the incoming e-mail is blocked or disclosed. The computer program product may further include the logic necessary to read administrator rules data, and assign the risk value to each section of an incoming e-mail message based on the administrator rules data. The computer program product may further include the logic necessary to read user preferences data, and assign the risk value to each section of an incoming e-mail message based on the user preferences data.

A method of the present invention is also presented to selectively review automatically filtered e-mail. In one embodiment, the method includes installing an e-mail screening tool on a mail server, and executing the e-mail screening tool. The e-mail screening tool may assign a risk value for each section of an incoming e-mail, present the incoming e-mail to a reviewer such that sections of the e-mail are blocked based on a risk value scale, and selectively disclose blocked sections of the incoming e-mail message to the reviewer in response to user input. In a further embodiment, the method may include receiving risk criteria from a system administrator, and entering the risk criteria as administrator rules data. Executing the e-mail screening tool may further comprise reading the administrator rules data, and adjusting the risk value for each section of the incoming e-mail based on the administrator rules data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
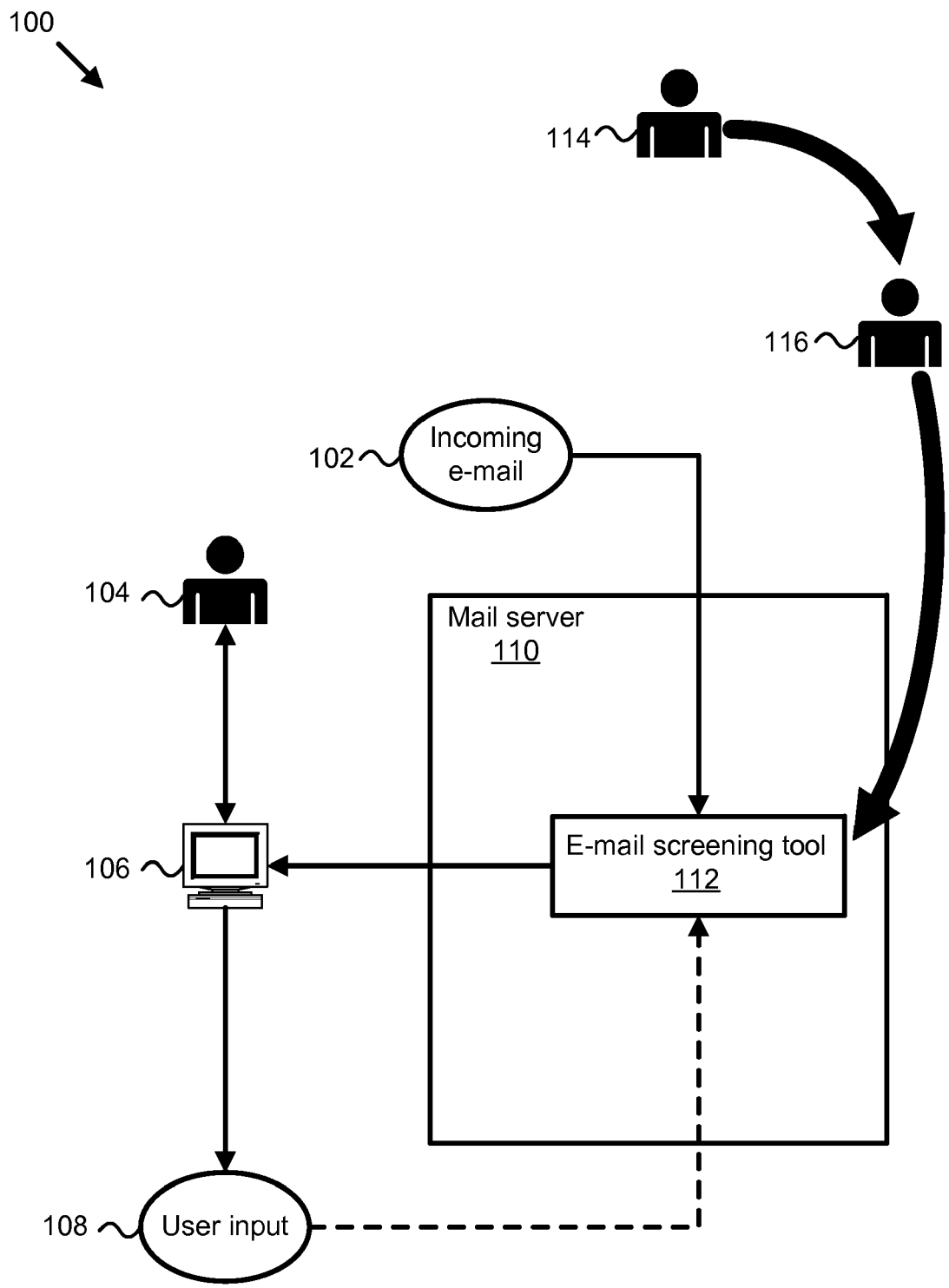
FIG. 1 is a schematic block diagram depicting one embodiment of system for selectively reviewing automatically filtered e-mail in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram depicting one embodiment of system 100 for selectively reviewing automatically filtered e-mail in accordance with the present invention. The system 100 may comprise an incoming e-mail 102 which passes into a mail server 110. The mail server 110 sends the e-mail 102 to an e-mail screening utility 112 configured to automatically filter the e-mail and present the filtered e-mail to a reviewer 104 via a computer 106 in communication with the mail server 110. The reviewer 104 may access the filtered e-mail through a tool or data location separate from a regular e-mail inbox. The reviewer 104 may send user input 108 back to the mail server 110 via a computer 106.

The system 100 may further comprise a system administrator 114 who may communicate preferences and requirements for the e-mail screening tool 112 to a technician 116 that installs software on the mail server 110. In some embodiments, the system administrator 114, the technician 116, and even the reviewer 104 may be the same person. In some embodiments, more than one person may fill the roles of the system administrator 114, the technician 116, and the reviewer 104. For example, in one embodiment, a computer system administrator 114 may provide some requirements for the e-mail screening tool 112 for computer security purposes, while a human resources manager 114 may provide some requirements for the e-mail screening tool 112 for a company spam e-mail policy implementation.

Figure 2:
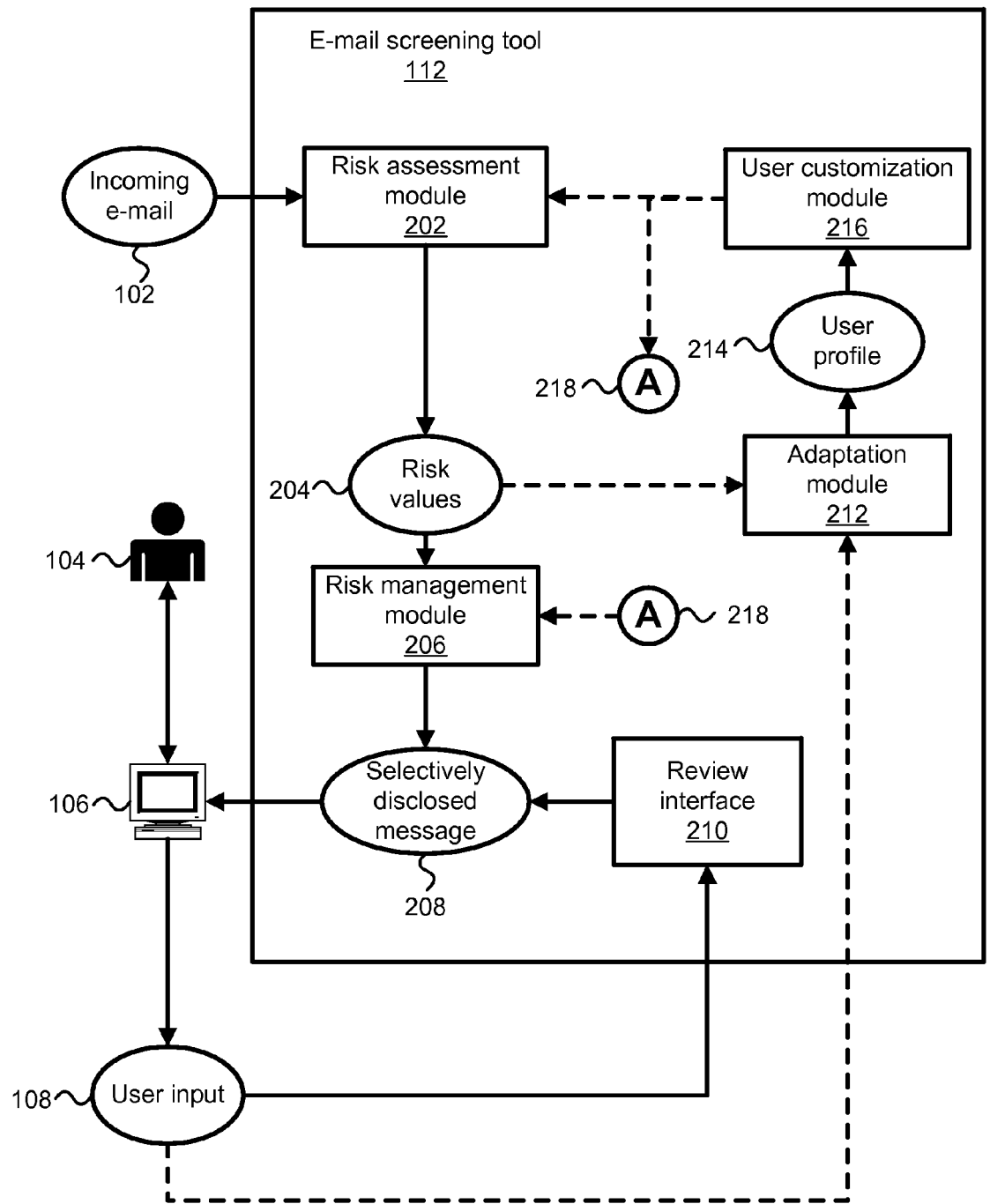
FIG. 2 is a schematic block diagram depicting one embodiment of an e-mail screening tool in accordance with the present invention.

FIG. 2 is a schematic block diagram depicting one embodiment of an e-mail screening tool 112 in accordance with the present invention. In one embodiment, the e-mail screening tool 112 may comprise a risk assessment module 202 configured to receive an incoming e-mail 102 from a mail server 110. The risk assessment module may be further configured to assign a risk value 204 to each section of the e-mail 102. The risk value 204 may comprise a number, a Boolean, or a risk label. For example, the risk value 204 could be number between 1 and 100 where 1 is associated with very little risk, and 100 is associated with significant risk; the risk value 204 could be TRUE or FALSE, where TRUE indicates a risky value and FALSE indicates a not risky value; or the risk value 204 could be a value selected from a set of risk labels, such as "LOW RISK," "MODERATE RISK," and "SEVERE RISK." Other schemes, ranges, and classifications for setting up a risk value will be understood by one of skill in the art and are contemplated within the scope of the present invention.

The sections of the e-mail 102 may comprise any discrete element of the e-mail 102 which is separable from the rest of the e-mail 102. Examples of sections of the e-mail 102 may include the subject line, the text of the e-mail body, the "From" line, the "To" line, attachments to the e-mail 102, images embedded in the e-mail 102, and information about the sender of the e-mail 102. This list is not meant to be exhaustive, and any information related to the e-mail 102 that assists the practitioner of the present invention with understanding the risk associated with a particular e-mail 102 should be understood to be available as a section. For example, if the originating time of day of the e-mail 102 were thought by a practitioner to be helpful in determining the risk level of a particular e-mail 102, the originating time of day could be a section of the e-mail 102.

In a further embodiment, the risk assessment module 202 may be configured to determine a set of constituent risk values for each section of the incoming e-mail 102 corresponding to a set of risk categories. A constituent risk value may be a risk value determined for a single section of an incoming e-mail 102 according to the content of that section related to one of a set of risk categories, and in some embodiments the constituent risk values may be used as part of a calculation to assign a risk value to the corresponding section of the e-mail 102. For example, a constituent risk value may reflect the risk inherent in the degree of offensive language present in the text body of the e-mail 102. Without limitation, the set of risk categories may comprise offensive language, unsolicited sales language, the presence of a picture, the presence of executable code, and information about the sender of the e-mail 102. Every section of the e-mail may not apply to each risk category. For example, an attachment may be checked for whether it is executable versus non-executable data, and whether the title of the attachment contains offensive language or unsolicited sales language. However, the attachment may not contain information about the sender and may not have a constituent risk value for sender information.

The risk value for a section, in one embodiment, can be determined as a function of the constituent risk values. For example, the risk value for a section may be determined by adding all of the constituent risk values. In another example, some constituent risk values may be added while others are multiplied. For example, the risk value for the attachment section may be the risk associated with the attachment name, plus the risk associated with the attachment type (e.g. data, image, audio, video, executable), multiplied by the risk value associated with the presence of the attachment (0=no attachment, 2=attachment). In the example, the risk associated with the attachment section of an e-mail 102 containing no attachment would automatically be zero. Other functions and manipulations of constituent risk values are within the skill of one in the art.

In one embodiment, the risk assessment module 202 may be configured to assign a risk value to the corresponding section of the e-mail 102 by selecting the highest constituent risk value from the set of constituent risk values for that section. In an example embodiment, the text body section of the e-mail 102 may contain a constituent risk value of 85 for the offensive language category, and a constituent risk value of 75 for the unsolicited sales language category. Thus, the text body section has multiple constituent risk values. Consequently, the risk assessment module 202 may assign a risk value of 85 to the text body section of the e-mail 102 by selecting the highest constituent risk value from the set of constituent risk values for that section.

The e-mail screening tool 112 may further comprise a risk management module 206 configured to present the incoming e-mail message 102 to a reviewer 104 as a selectively disclosed message 208 such that sections of the e-mail 102 are blocked based on a risk value scale.

A blocked section as used herein indicates that the blocked section will not be available for the user to see, read, play or otherwise be exposed to the content of the blocked section in an e-mail review window. In certain embodiments, the blocking of a section may be complete or partial. For example, if the subject line section is blocked from the user, the entire subject line may be blocked, or the subject line may be shown with potentially offensive words hidden or removed. Further, blocking may involve complete removal of the section from the e-mail 102.

A disclosed section as used herein indicates that the section will be available for the user to see, read, play or otherwise be exposed to the content of the section in an e-mail review window. In certain embodiments, the disclosure of a section may be complete or partial. For example, if some offensive language in the text body rates a lower risk value than other offensive language, in some embodiments the lower risk language may be disclosed while the higher risk language remains blocked. Further, disclosure may involve restoring the section to the e-mail 102 that was removed when the section was blocked.

In one embodiment, the risk management module 206 may be configured to block any sections of the e-mail 102 which contain content with a risk value 204 above a defined threshold on a risk value scale. For example, the risk management module 206 may be configured to block any sections of the e-mail 102 with a risk value 204 greater than "75."In the example, if the e-mail 102 were deemed to have a risk value of "0" in all sections, except that the e-mail 102 has an embedded picture with a risk value of "90," the selectively disclosed message 208 would comprise the e-mail 102 with the embedded picture blocked from the reviewer 104. In an alternative embodiment, the risk management module 206 may be configured to block all sections except the subject line of an e-mail 102 which has any section with a risk value 204 greater than a defined threshold on a risk value scale. In a further embodiment, the risk management module 206 may be configured to block the subject line of an e-mail 102 which has a subject line with a risk value 204 greater than a defined threshold on a risk value scale. Of course other embodiments may include a risk value scale and risk value threshold for each section.

The e-mail screening tool 112 may further comprise a review interface 110 configured to selectively disclose sections of the e-mail 102 in response to user input 108 from a reviewer 104 through a computer 106. In a first embodiment, the user input 108 may comprise activating a GUI slider where one end of the slider corresponds to a lowest possible risk threshold, and the other end corresponds to a highest possible risk threshold.

In the first embodiment, if the reviewer 104 places the GUI slider at the lowest level, all sections of the e-mail 102 would be blocked since all sections would be at least equal to the lowest risk threshold. If the reviewer 104 places the GUI slider at the highest level, all sections of the e-mail 102 would be revealed since all sections would be less than the highest risk threshold. As the reviewer 104 moves the GUI slider from the low level to the high level, progressively riskier sections of the e-mail 102 would be disclosed to the reviewer 104 by the review interface 110 until the reviewer 104 obtained enough information to determine whether the e-mail 102 should be removed from the filtered set or not.

In a second embodiment, the user input 108 may comprise activation of a plurality of GUI components, each GUI component associated with a section of the e-mail 102. The GUI component may comprise checkboxes, radio buttons, or the like. In one example, an e-mail 102 may comprise three (3) sections—a subject line, text body, and embedded image. The GUI components may comprise three (3) check boxes associated with the three (3) sections, where a check in a box indicates that the associated section of the e-mail 102 should be shown. The GUI components could start checked or unchecked according to the determinations of the risk assessment module and the risk management module, and the reviewer 104 could activate a check box to disclose or block sections via the review interface 210.

The e-mail screening tool 112 may further comprise an adaptation module 212 configured to generate a user profile 214 based on the risk value 204 assigned to each section of the incoming e-mail 102 and the user input 108. The adaptation module 212 may be further configured to store the user profile 214. The user profile 214 may contain information derived from the recorded risk values 204 and recorded user input 108. The information stored in the user profile 214 may be used in an algorithm that adapts the output of the risk assessment module 202 and the risk management module 206 to the recorded risk values 204 and recorded user input 108.

The e-mail screening tool 112 may further comprise a user customization module 216 configured to read the user profile 214 and modify the blocking for sections of the incoming e-mail 102 based on the user profile 214. The user customization module 216 may be configured to communicate with the risk assessment module 202 and to communicate 218 with the risk management module 206 to modify the blocking of sections of the incoming e-mail 102. The use of the user profile 214 to modify the blocking of sections of the incoming e-mail 102 is flexible, and four illustrative examples are provided, but many other uses are within the skill of one in the art. For the purposes of the examples, e-mail 102 sections which the reviewer 104 blocks or allows to remain blocked are called blocked sections, while e-mail 102 sections which the reviewer 104 unblocks or allows to remain unblocked are called disclosed sections.

In the first example, assume a risk value threshold for the text body section of e-mails 102 is 50 for a given reviewer 104. Further assume that the reviewer 104 reviews 1000 e-mails for a given month. The adaptation module 212 may record the risk value 204 for the text body section of each e-mail 102, and the user input 108 for each e-mail 102 determining whether the text body section of a given e-mail 102 is blocked or disclosed. Assume that the text body section of 700 e-mails 102 for the example month are disclosed, and that the average risk value 204 for the text body section of those e-mails is 65. Further assume that the text body section of 300 e-mails 102 for the example month are blocked, and that the average risk value 204 for the text body section of those e-mails is 90. In one embodiment, the adaptation module 212 may record a user profile 214 indicating for text body sections, the reviewer 104 blocked 300 sections with an average risk value of 90, and disclosed 700 sections with an average risk value of 65. For the first example, the user customization module 216 may read the user profile 214, and communicate with the risk management module 206 to move the risk value threshold for the text body section of e-mails 102 from 50 to 65, since 65 is the average risk value of the text body sections for which the reviewer 104 provides user input 108 to disclose.

In the second example, assume all information from the first example applies. Further assume that the original risk value threshold for the text body section of e-mails 102 was based on an average text body section risk value of 50 for 2500 disclosed e-mails 102. In one embodiment, the adaptation module 212 may record a user profile 214 at the end of the month in question of 3200 disclosed e-mails 102, with an average text body section risk value of 53.3. For the second example, the user customization module 216 may read the user profile 214, and communicate with the risk management module 206 to move the risk value threshold for the text body section of e-mails 102 from 50 to 53.3, since 53.3 is the new average risk value of the text body sections which the reviewer 104 provides user input 108 to disclose.

In the third example, assume all information from the first example applies. In one embodiment, the adaptation module 212 may record a user profile 214 indicating that for text body sections, the risk value 77.5 sits exactly in the center between the average risk value for blocked sections versus the average risk value for disclosed sections. For the third example, the user customization module 216 may read the user profile 214, and communicate with the risk management module 206 to move the risk value threshold for the text body section of e-mails 102 from 50 to 77.5, since this may be a value considered to get most of the text body section blocking versus disclosure decisions aligned with the likely user input 108.

In the fourth example, assume that the reviewer 104 reviews 1000 e-mails 102 for a given month. Further assume that the adaptation module 212 records the risk values 204 of the text body section for only each e-mail 102 where the reviewer 104 provides user input 108 to change the text body section of an e-mail 102 from blocked to disclosed. For the month in question, assume that the reviewer 104 changed the text body section of 30 e-mails 102 from blocked to disclosed, and that the risk values 204 for the text body section of these e-mails 102 averaged 70. In one embodiment, the adaptation module 212 may record a user profile 214 indicating multiplier of 0.71. For the example, this value is derived from the assigned risk value threshold for text body sections of 50, and the average risk value for the text body section of e-mails 102 where the user input 108 indicated that the reviewer 104 disagreed with the outcome from the risk assessment module 202 and the risk management module 206. For the fourth example, the user customization module 216 may read the user profile 214, and communicate with the risk assessment module 202 such that the risk values 204 for the text body section for each e-mail 102 will be multiplied by 0.71 after other determinations are made. In the example, it can be seen that e-mails 102 which would have previously generated a 70 risk value 204 for the text body section would generate a risk value 204 of 50 after adjustments based on the user profile 214.

Other manipulations of the adaptation module 212, the user profile 214, and the user customization module 216 are possible based on the level of skill of one in the art and the examples presented here. All of these are contemplated within the scope of the present invention.

Figure 3:
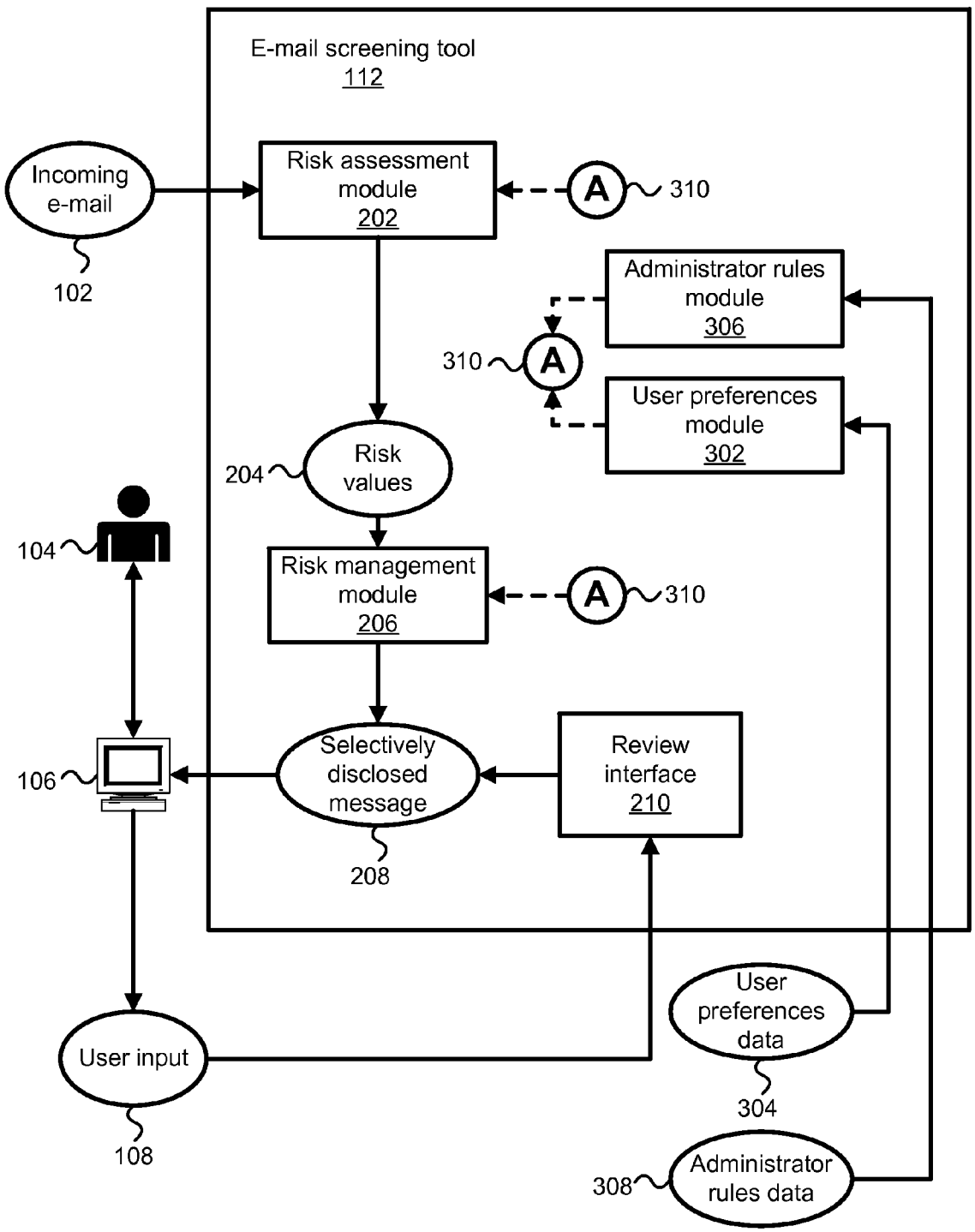
FIG. 3 is a schematic block diagram depicting an alternative embodiment of an e-mail screening tool in accordance with the present invention.

FIG. 3 is a schematic block diagram depicting one embodiment of an e-mail screening tool 112 in accordance with the present invention. The e-mail screening tool 112 may comprise an administrator rules module 306. The administrator rules module 306 may be configured to read administrator rules data 308, and to communicate 310 the administrator rules data 308 to the risk assessment module 202 and the risk management module 206.

In one embodiment, the risk management module 206 is further configured to modify the blocked sections of the incoming e-mail 102 based on the administrator rules data 308. For example, the administrator rules data 308 may contain a rule to block all e-mail 102 sections that contain words of a racially offensive nature. Certain administrator rules may override existing risk values 204 and/or risk value thresholds for certain sections. In the example, regardless of the outcome of the risk values 204 and risk value thresholds, sections of the e-mail 102 which contain words of a racially offensive nature will be blocked. In another example, the administrator rules data 308 may contain a rule to reduce the risk value threshold for sections of an e-mail 102 containing a certain list of words by fifty-percent. In the example, any sections of the e-mail 102 containing a word on the administrator rule list will be blocked more readily than other words which generate a similar risk value 204. In another example, the administrator rules data 306 may contain a rule to always disclose a certain set of text if it exists—for example a legal disclaimer—regardless of the determinations of the risk assessment module 202 and the risk management module 206.

The administrator rules module 306 may be configured to apply rules in a permissive or non-permissive fashion. In one example, if the administrator rules module 306 applied a rule in a non-permissive fashion, then an e-mail 102 section blocked due to the rule may not be disclosed even if the risk values 204, user input 108, or user profile 214 might otherwise indicate that the blocked section should be disclosed. One of skill in the art will immediately appreciate the power of the administrator rules module 306, and the various iterations of permissive and non-permissive rules, communications with the risk management module 206, and communications with the risk assessment module that are possible. The administrator rules module 306 is particularly useful for implementing company policies for security or workplace environment, while providing reviewers 104 with the maximum flexibility otherwise provided by the present invention.

The e-mail screening tool 112 may further comprise a user preferences module 302 configured to read user preferences data 304 and modify the blocked sections of the e-mail 102 based on the user preferences data 304. For example, the user preferences data 304 may contain a user preference to always show embedded images regardless of the determinations of the risk assessment module 202 and the risk management module 206. In another example, the user preferences data 304 may contain a list of words, and a multiplier for each word, and the user preferences module 302 may be configured to communicate with either the risk assessment module 202 to modify the risk values 204 according to the multipliers in the user preferences data 304, or with the risk management module 206 to modify the risk value threshold according to the multipliers in the user preferences data 304.

Figures 4A, 4B:
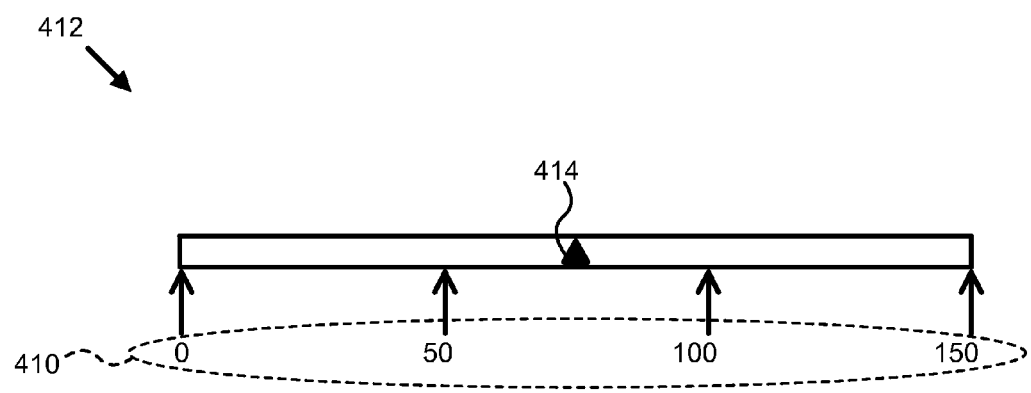
FIG. 4A illustrates one embodiment of a risk value assigned to each section of an incoming e-mail in accordance with the present invention.
FIG. 4B illustrates one embodiment of a GUI slider in accordance with the present invention.

FIG. 4A illustrates one embodiment of a risk value 408 assigned to each section of an incoming e-mail in accordance with the present invention. FIG. 4A further illustrates a risk assessment module 202 configured to determine a set of constituent risk values 406 to each section 404 of an incoming e-mail message. For purposes of the illustration, the e-mail 102 contains offensive language which rates a 25 in the subject line, offensive language which rates a 65 in the text body, and offensive language which rates a 120 in the attachment name. The offensive language in each section may be the same language or not, since the algorithm which determines the constituent risk value does not need to assign the same value to each section for the same language.

For example, offensive language in the name of an attachment may be deemed especially risky in one embodiment of the present invention because a malicious file may be more risky than merely bad language. In another example, offensive language in the subject line may generate a lower risk value such that the overall embodiment will favor showing subject lines to give the reviewer 104 a little information to work with when determining whether an e-mail 102 should be eliminated. The determinations of risk values based on the section and the risky material are within the skill of one in the art, and depend upon the goals of the practitioner of the present invention.

The risk assessment module 202 in FIG. 4A determines the set of constituent risk values 406 for each section 404 of the e-mail 102 based upon a set of risk categories 402. In one embodiment, the risk categories 402 may include offensive language, sales language, executable code, a picture or image, and the sender of the e-mail 102. In the illustrated embodiment 408, the risk value for each section 408 is determined from the maximum of the set of constituent risk values 406 for the section 404 in question. For example, for the attachment section, the constituent risk values 406 are (120, 0, 0, 90, 10) and the section risk value 408 for the attachment section is assigned to be 120, or the maximum of the constituent risk values 406. As discussed above in relation to the risk assessment module 202 in FIG. 2, other functions using the constituent risk values 406 may be used to assign the section risk values 408.

FIG. 4B illustrates one embodiment of a GUI slider 412 in accordance with the present invention. In one embodiment, the reviewer 104 can drag the pointer 414 to a desired location on the slider 412 to set a desired risk value threshold. The slider 412 may further comprise a risk value scale 410. In the illustration, the pointer 414 is at a position on the risk value scale 410 indicating a risk value threshold of approximately 75.

If the slider 412 were associated with the section risk values 408 of FIG. 4A, the risk management module 206 may display the subject line and text body sections of the e-mail 102, while blocking the attachment section. In the example of FIG. 4A, the e-mail 102 does not contain embedded code or an embedded image, so there is nothing to block. In a further example, if the reviewer 104 clicks on the slider 412, or drags the pointer 414 to select a risk value threshold of 50, the risk management module 206 may display the section subject line, while blocking the sections text body and attachment since these have a risk value 408 higher than the new risk value threshold of 50. In this example, the reviewer 104 would be shown only the subject line of the e-mail 102. Likewise, if the reviewer 104 clicked on the slider 412 to select a risk value threshold of 150, the risk management module 206 may show all sections of the e-mail 102 since all of the section risk values 408 are below the risk value threshold of 150.

The slider 412 may be in the same or a separate window from window displaying the e-mail 102. The blocking and disclosing applied by the review interface 210 to sections of the e-mail 102 based on the user input 108 to the slider 412 may be displayed dynamically, or the reviewer 104 may review the settings before applying them. Further, the slider 412 may be associated with multiple selected e-mails 102 simultaneously. For example, the review interface 210 may selectively disclose subject lines for a batch of filtered emails.

Figure 5:
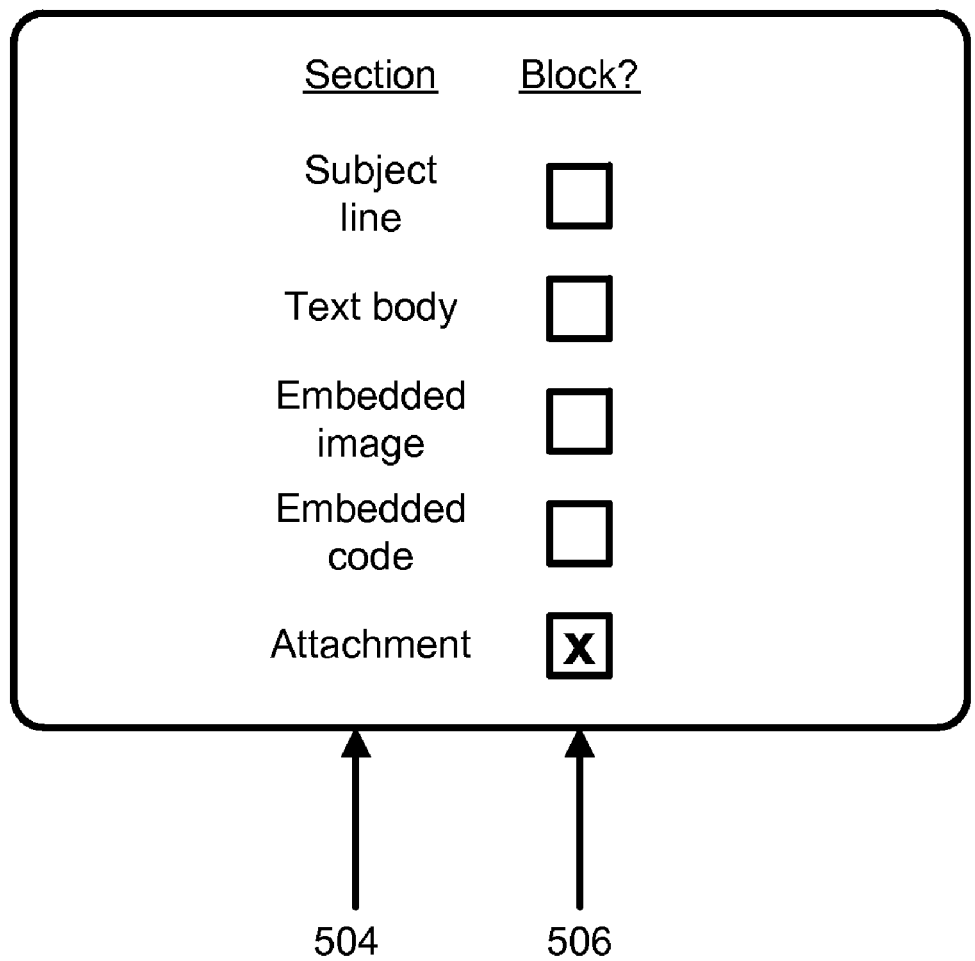
FIG. 5 illustrates one embodiment of a plurality of GUI components in accordance with the present invention.

FIG. 5 illustrates one embodiment of a plurality of GUI components 502 in accordance with the present invention. In one example, the plurality of GUI components 502 may contain a list of sections 504 of the e-mail 102 and a series of binary selections 506 corresponding to the list of sections 504. In one embodiment, the series of binary selections 506 are pre-checked according to the determinations of the risk assessment module 202 and risk management module 206.

In the illustration of FIG. 5, the series of binary selections 506 are consistent with the section risk values 408 of FIG. 4A, and the slider 412 and pointer 414 settings of FIG. 4B. In one embodiment, the reviewer 104 can check or uncheck members of the series of binary selections 506 to block or reveal the corresponding sections of selected e-mails 102. Various embellishments of the presented GUI 502 are known in the art and contemplated within the scope of the present invention. Without limitation, these include graying out selections 506 which do not apply for a particular e-mail, giving the selections 506 a different appearance when multiple e-mails 102 are selected and the section risk values 408 do not give the same results for the initial display of the selections 506, and a different appearance of selections 506 after the reviewer 104 has altered the initial display by setting selections 506 differently from the initial determinations made by the risk assessment module 202 and the risk management module 206.

The schematic flow chart diagrams herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
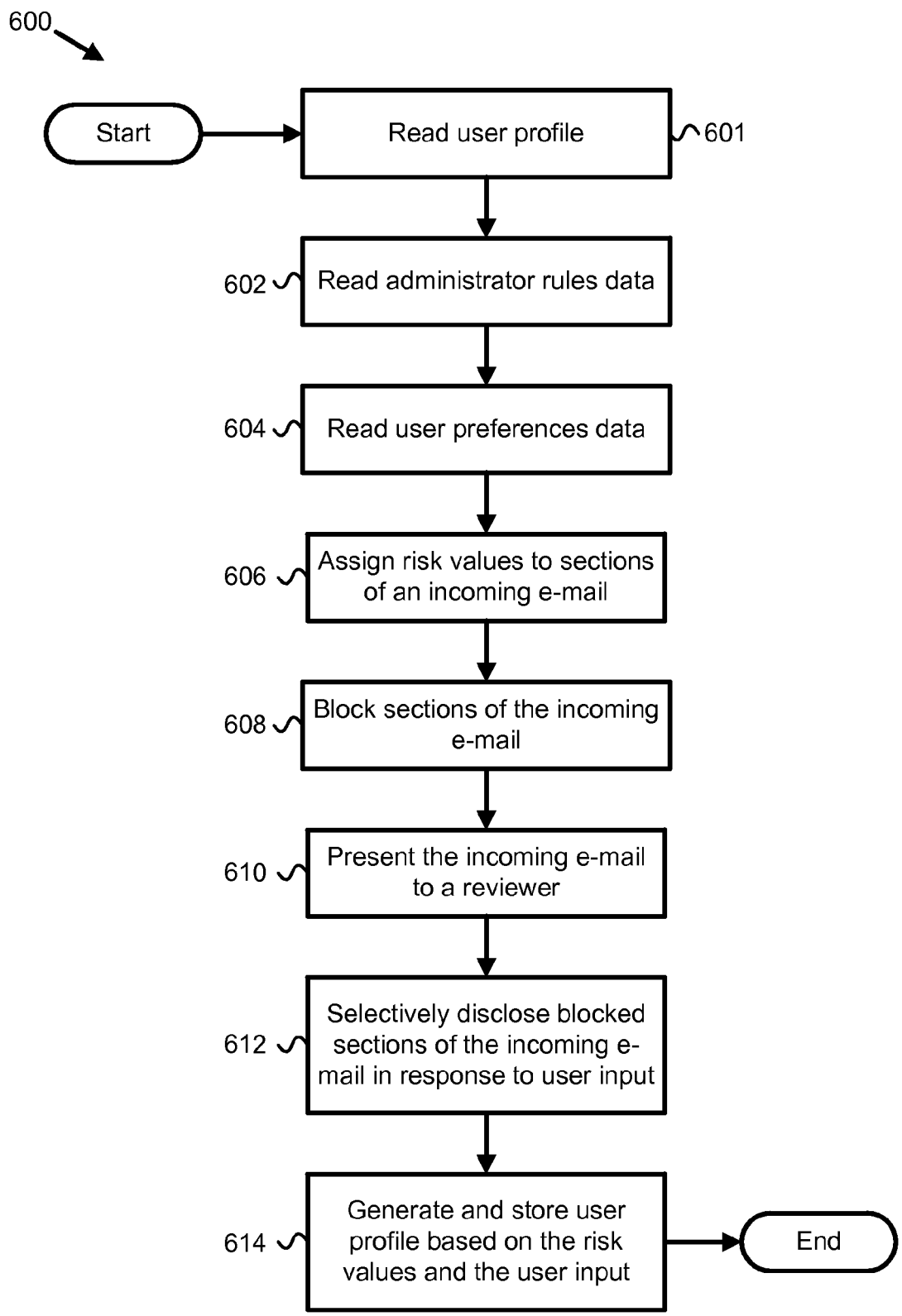
FIG. 6 is a schematic flow chart illustrating one embodiment of a method to filter and selectively review e-mail in accordance with the present invention.

FIG. 6 is a schematic flow chart illustrating one embodiment of a method 600 to filter and selectively review e-mail 102 in accordance with the present invention. The method 600 may begin with the user customization module 216 reading 601 a user profile 214. The method 600 may proceed with the administrator rules module 306 reading 602 administrator rules data 308. Next, the user preferences module 302 may read 604 user preferences data 304.

The risk assessment module 202 may then assign 606 risk values 204 to sections of an incoming e-mail 102 based on the user preferences data 304, the administrator rules data 306, and/or the user profile 214. The risk management module 206 may then block 608 sections of the incoming e-mail 102. Blocking a section may comprise setting an indicator that is used by the review interface 210 to determine which sections to disclose. The review interface 210 may then present 610 the selectively disclosed e-mail 208 to a reviewer 104.

The review interface 210 may then selectively disclose 612 blocked sections of the incoming e-mail 102 to the reviewer 104 based on user input 108. The method 600 may conclude with the adaptation module 212 generating and storing 614 an updated user profile 214 based on the risk values 204 and the user input 108.

Figure 7:
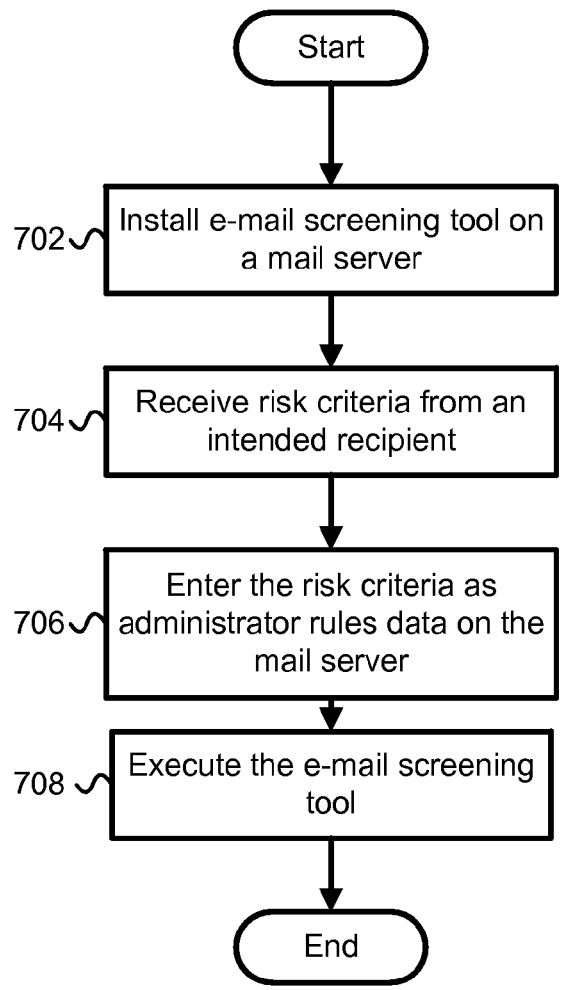
FIG. 7 is a schematic flow chart illustrating one embodiment of a method to selectively review automatically filtered e-mail in accordance with the present invention.

FIG. 7 is a schematic flow chart illustrating one embodiment of a method 700 to selectively review automatically filtered e-mail 102 in accordance with the present invention. The method 700 may begin with a technician 116 installing 702 an e-mail screening tool 112 on a mail server 110. The technician 116 receives 704 risk criteria from a system administrator 114, and enters the risk criteria as administrator rules data 308 on the mail server 110. Risk criteria may include anything that may be deemed as relevant to the level of risk an e-mail 102 may present. For example, risk criteria may include the size or file type of an attachment, a set of key words, the presence of a picture, a list of hostile mail servers, and the like.

The method 700 may conclude with a reviewer 104 executing 708 the e-mail screening tool 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to selectively review portions of automatically filtered e-mail, the apparatus comprising:
   a risk assessment module that assigns a risk value on a risk value scale to content of each section of an incoming e-mail message, the sections of the incoming e-mail message comprising at least an attachment section and a non-attachment section;
   a risk management module that compares the risk value of each section of the email to the risk value scale and presents one or more sections of the incoming e-mail message to a reviewer such that content of a section of the incoming e-mail message is blocked in response to the risk value of the content of a section exceeding a threshold on the risk value scale; and
   a review interface that selectively discloses to the reviewer, in response to user input, the blocked content of the one or more sections of the incoming e-mail message, the user input comprising movement of a Graphical User Interface ("GUI") slider having graduated levels between a first level that reveals no sections of the incoming e-mail message and a second level that reveals all sections of the incoming e-mail message, each graduated level associated with a risk value threshold, the review interface dynamically updating the blocked content that is disclosed to the reviewer in response to movement of the GUI slider, the review interface dynamically presenting previously blocked content of the one or more sections to the reviewer in response to movement of the GUI slider toward the second level and dynamically blocking content of the one or more sections in response to movement of the GUI slider toward the first level.

2. The apparatus of claim 1, wherein the user input comprises activation of a plurality of GUI components, each GUI component associated with a section of the incoming e-mail message.

3. The apparatus of claim 1, further comprising:
   an adaptation module that records the risk value assigned to each section of the incoming e-mail message, to record the user input, and to store a user profile comprising information derived from the recorded risk values and recorded user input; and
   a user customization module that reads the user profile and modifies the blocked sections of the incoming e-mail based on the user profile.

4. The apparatus of claim 1, wherein the sections of the incoming e-mail are blocked by removing the blocked sections from the e-mail, and wherein selectively disclosing blocked sections of the e-mail comprises restoring the blocked sections to the e-mail.

5. The apparatus of claim 1, further comprising an administrator rules module that reads administrator rules data, and wherein the risk management module modifies the blocked sections of the incoming e-mail based on the administrator rules data.

6. The apparatus of claim 1, further comprising a user preferences module that reads user preferences data, and wherein the risk management module modifies the blocked sections of the incoming e-mail based on the user preferences data.

7. The apparatus of claim 1, further comprising an administrator rules module that reads administrator rules data, and wherein the risk assessment module assigns a risk value to each section of the incoming e-mail message based on the administrator rules data.

8. The apparatus of claim 1, further comprising a user preferences module that reads user preferences data, and wherein the risk assessment module assigns a risk value to each section of the incoming e-mail message based on the user preferences data.

9. The apparatus of claim 1, wherein the sections of the incoming e-mail comprise at least one of a subject line, a text body, an embedded image, embedded machine executable program code, and attachments.

10. The apparatus of claim 1, wherein the risk assessment module determines a set of constituent risk values for each section of the incoming e-mail corresponding to a set of risk categories, and assigns the risk value for each section by selecting the highest constituent risk value from the set of constituent risk values for each section.

11. The apparatus of claim 10, wherein the set of risk categories comprise offensive language, unsolicited sales language, the presence of an image, the presence of machine executable program code, and sender information.

12. A computer program product comprising a computer readable medium having computer usable program code programmed to filter and selectively review e-mail, the programming product having operations comprising:
   assigning a risk value on a risk value scale to content of each section of an incoming e-mail message, the sections of the incoming e-mail message comprising at least an attachment section and a non-attachment section;
   comparing the risk value of each section of the email to the risk value scale;
   presenting one or more sections of the incoming e-mail message to a reviewer such that content of a section of the incoming e-mail message is blocked in response to the risk value of the content of a section exceeding a threshold on the risk value scale;

selectively disclosing to the reviewer, in response to user input, the blocked content of the one or more sections of the incoming e-mail message, the user input comprising movement of a Graphical User Interface ("GUI") slider having graduated levels between a first level that reveals no sections of the incoming e-mail message and a second level that reveals all sections of the incoming e-mail message, each graduated level associated with a risk value threshold;

updating the blocked content that is disclosed to the reviewer dynamically in response to movement of the GUI slider;

presenting previously blocked content of the one or more sections to the reviewer dynamically in response to movement of the GUI slider toward the second level; and blocking content of the one or more sections dynamically in response to movement of the GUI slider toward the first level.

13. The computer program product of claim 12, wherein the user input comprises a series of binary selections, each binary selection corresponding to one of the sections of the incoming e-mail, the operations further comprising disclosing sections of the incoming e-mail based on the state of each corresponding binary selection.

14. The computer program product of claim 12, further comprising reading administrator rules data, and wherein assigning a risk value comprises assigning a risk value based on the administrator rules data.

15. The computer program product of claim 12, further comprising reading user preferences data, and wherein assigning a risk value comprises assigning a risk value based on the user preferences data.

16. The computer program product of claim 12, further comprising generating a user profile based on the risk value assigned to each section of the incoming e-mail message and the user input, storing the user profile, and wherein blocking sections of the incoming e-mail further includes blocking sections of the incoming e-mail based at least in part on the user profile.

17. A method to selectively review automatically filtered e-mail, the method comprising:

installing an e-mail screening tool on a mail server; and
executing the e-mail screening tool to:
assign a risk value on a risk value scale to content of each section of an incoming e-mail message, the sections of the incoming e-mail message comprising at least an attachment section and a non-attachment section;
compare the risk value of each section of the email to the risk value scale;
present one or more sections of the incoming e-mail message to a reviewer such that content of a section of the incoming e-mail message is blocked in response to the risk value of the content of a section exceeding a threshold on the risk value scale;
selectively disclose to the reviewer, in response to user input, the blocked content of the one or more sections of the incoming e-mail message, the user input comprising movement of a Graphical User Interface ("GUI") slider having graduated levels between a first level that reveals no sections of the incoming e-mail message and a second level that reveals all sections of the incoming e-mail message, each graduated level associated with a risk value threshold;
update the blocked content that is disclosed to the reviewer dynamically in response to movement of the GUI slider;
present previously blocked content of the one or more sections to the reviewer dynamically in response to movement of the GUI slider toward the second level; and
block content of the one or more sections dynamically in response to movement of the GUI slider toward the first level.

18. The method of claim 17, further comprising:
receiving risk criteria from a system administrator, storing the risk criteria as administrator rules data; and
executing the e-mail screening tool to:
read the administrator rules data; and
adjust the risk value for each section of the incoming e-mail based on the administrator rules data.

* * * * *